United States Patent Office 2,877,190
Patented Mar. 10, 1959

2,877,190

PREPARATION OF p-XYLYLENE GLYCOL POLYMERS

Peter J. Canterino, Bartlesville, Okla., assignor to Phillips Petroleum Company, a corporation of Delaware No Drawing. Application July 29, 1957
Serial No. 674,619

8 Claims. (Cl. 260—2)

This invention relates to a method for preparing p-xylylene glycol polymers. In one aspect, the invention relates to a catalytic method for preparing solid polymers of p-xylylene glycol containing substantially no gel by use of certain diluents in the reaction mixture. In another aspect, the invention relates to the preparation of soluble solid p-xylylene glycol polymers.

Polymers of p-xylylene glycol have been previously prepared but these polymers were only partially soluble in solvents and apparently formed a network or cross-linked structure, possibly because of nuclear condensation at the ortho positions.

It is, therefore, an object of the invention to provide a method for the preparation of polymers from p-xylylene glycol. It is a further object of the invention to provide a process for the preparation of solid polymers of p-xylylene glycol which are soluble in organic solvents and do not contain gel. Other objects, as well as aspects and advantages, of the invention will become apparent from a consideration of the accompanying disclosure.

According to the invention, there is provided a process for the polymerization of p-xylylene glycol to a solid polymer which comprises catalytically polymerizing p-xylylene glycol in the presence of at least one of certain solvents capable of undergoing Friedel-Crafts reactions. Preferred catalysts are the hydrocarbon sulfonic acids.

Solvents employed in the process of the invention are benzene and alkyl-substituted benzenes in which the number of alkyl groups does not exceed 3, the total number of carbon atoms in the alkyl substituents is not greater than 6, and the number of carbon atoms per alkyl substituent does not exceed 4. Examples of such solvents include benzene, toluene, ortho-, meta-, and paraxylene, 1,2,3-triethylbenzene, 1,2,4-triethylbenzene, 1,3,5-triethylbenzene, hemimellitene, pseudocumene, mesitylene, cumene, ethylbenzene, ortho-, meta-, and paradiethylbenzene, n-propylbenzene, n-butylbenzene, tert-butylbenzene, 2-phenylbutane, isobutylbenzene, 1-ethyl-4-isobutylbenzene, 1-ethyl-3-isopropylbenzene, 1-ethyl-4-isopropylbenzene, ortho-, meta-, and paraethyltoluene, ortho-, meta-, and parabutyltoluene, ortho-, meta-, and p-tert-butyltoluene, ortho-, meta-, and parapropyltoluene, and 3,5-diethyltoluene.

I have discovered that if the polymerization is effected in the presence of a solvent as defined above, a solid soluble polymer is obtained. Although I am not certain of the mechanism of my process which results in the formation of soluble polymers free from gel and cross-linking, it is believed that the defined solvents serve as chain regulating agents by reacting with the terminal hydroxy groups of the polyether chain and thus prevent cross-linking which otherwise occurs.

The amount of the defined solvent employed is generally in the range between 1 and 10 parts by weight per part of p-xylylene glycol, although this amount is preferably in the range between 3 and 6 parts by weight per part of p-xylylene glycol.

Examples of the hydrocarbon sulfonic acid catalyst are alkane sulfonic acids including aryl alkane sulfonic acids, cycloalkane sulfonic acids, and aromatic sulfonic acids including alkyl aromatic sulfonic acids.

The hydrocarbon sulfonic acid catalysts employed in the process of the invention usually contain from 2 to not more than 16 carbon atoms per molecule, although hydrocarbon sulfonic acids containing more or less carbon atoms are applicable.

Particularly suitable catalysts are aromatic sulfonic acids such as benzenesulfonic acid and toluenesulfonic acids, including the ortho-, meta-, and para-toluenesulfonic acids. Examples of other catalysts include ethanesulfonic acid, propanesulfonic acids, 1-butanesulfonic acid, 2-butanesulfonic acid, isobutanesulfonic acid, 1-pentanesulfonic acid, 2-pentanesulfonic acid, 2-methyl-2-butanesulfonic acid, 1-hexanesulfonic acid, 2-hexanesulfonic acid, 1-octanesulfonic acid, 1-dodecanesulfonic acid, 2-methyl-2-undecanesulfonic acid, cycloexanesulfonic acid, methylcyclohexanesulfonic acid, 3-hexadecanesulfonic acid, and methylcyclopentanesulfonic acid.

The amount of catalyst employed is generally in the range between 0.01 and 2 grams per 100 grams of p-xylylene glycol; preferably this range is from 0.1 to 1 gram of catalyst per 100 grams of p-xylylene glycol.

The reaction is usually effected at a temperature in the range between 80 and 200° C., although higher or lower temperatures are applicable. The temperature is preferably not above 155° C., more preferably not above 140° C. It is preferred to operate at a temperature not above the atmospheric boiling point of the defined solvent being employed. Atmospheric pressure is convenient, although pressures above and below atmospheric pressure can be employed. Of course, the temperature should not be allowed to rise above the decomposition temperature of any of the ingredients in the particular reaction mixture.

The polyether products of the invention are hard, wax-like materials having a molecular weight of at least 300 as determined by boiling point elevation in benzene, and are excellent polishing waxes for various types of surfaces. They impart a hard, high lustre when applied to wood, vinyl tile, and other surface materials. They are also suitable for the preparation of wax compositions in liquid form, by forming a dispersion or solution of the polyether waxes in a hydrocarbon solvent.

The following examples are illustrative only.

*Example 1*

Into a round bottom flask equipped with a stirrer, thermometer, moisture vapor trap, and condenser was charged 100 ml. xylene, 20 grams p-xylylene glycol, and 0.2 gram toluenesulfonic acid. The reaction mixture was maintained at 130° C. for 25 hours while stirring. The reaction mixture was cooled to room temperature and the polymer precipitated and was recovered on a filter and then dried in a vacuum oven at 50° C. for 12 hours. The polymer so formed had a molecular weight of about 1,500 as determined by boiling point elevation in benzene.

Using the same apparatus as in the preceding reaction, the reaction was repeated employing 100 grams mineral oil instead of xylene, 20 grams of p-xylylene glycol and 0.2 gram toluenesulfonic acid. The heating of the reaction mixture was at 110–130° C. for a period of 15 hours. The polymer precipitated as it was formed. After the reaction the mixture was poured into toluene, filtered, washed with isopropyl alcohol and then dried in a vacuum oven at 50° C. for 12 hours. The molecular weight of the polymer could not be determined since it was gelled. This reaction was repeated again employing 200 ml. mineral oil (Nujol), 40 grams of p-xylylene glycol and 0.25 gram toluenesulfonic acid. Heating was again with stirring at 110–150° C. for 8 hours, and recovery was as before.

Solubility of the samples prepared in the three runs was determined by attempting to dissolve a sample of the polymer in a 50–50 volume percent mixture of toluene and methyl ethyl ketone and heating the solvent to reflux temperature. Solubility was indicated by a clear solution while residual suspended and swollen polymer indicated insolubility and presence of gel due to cross-linking. The two samples prepared in the presence of mineral oil as a solvent were insoluble and gelled, while the sample prepared with xylene as a solvent according to the invention was soluble. Solubility was similarly determined employing benzene as the solvent, and the two samples prepared in Nujol were also insoluble in boiling benzene, while the sample prepared in xylene was soluble in boiling benzene. One gram polymer/100 ml. solvent was employed in the solubility tests.

*Example II*

A mixture of 50 grams (0.362 mol) of p-xylylene glycol, 500 cc. (447 grams) of benzene, and 1 gram (0.0058 mol) of p-toluenesulfonic acid was refluxed six hours. A very slow reaction occurred as evidenced by 1 cc. of water being collected. Toluene (300 cc., 259.8 grams) was added and the mixture was boiled until 300 cc. of benzene had distilled. Heating was continued for an additional 20 hours at 90° C. Five cc. of water was collected during the heating period after toluene was introduced. When water ceased to be evolved, heating was discontinued. A white product had precipitated. The reaction mixture was poured, with stirring, into approximately 500 cc. of isopropyl alcohol and the solid product was separated by filtration and dried in a vacuum oven at 65° C. for 36 hours. A hard, white, crystalline powder was obtained. It weighed 35 grams, had a hydroxyl number of 123, a melting point of 93° C., and a gram molecular weight, determined by boiling point elevation in benzene, of 1225.

The poly-(p-xylylene glycol) was employed in making up a formulation to test as a polishing wax. The formulation was as follows:

| | Grams |
|---|---|
| Poly-(p-xylylene glycol) | 20 |
| Turpentine | 50 |
| Toluene | 30 |

The poly-(p-xylylene glycol) did not dissolve in the turpentine but upon addition of toluene and warming the mixture to 60° C., the composition become clear. A cloudy dispersion resulted when it was cooled.

The liquid wax composition was applied to black vinyl tile with cheesecloth and allowed to dry 20 minutes. The Gardner washability and abrasion testing machine, Model 105, was used for polishing, employing the abrasion boat with a special weight (4.5 pounds total weight). Four layers of cheesecloth were applied to the abrasion boat. The first 100 strokes of the machine was for the purpose of removing excess wax. The cheesecloth was replaced with new material at the end of each 1000 strokes, thereafter and at each interval of 1000 strokes, gloss was determined with a photovolt glossmeter to get 60 degree specular reflectance. A control was run in the same manner using black vinyl tile to which no wax had been applied. Results were as follows:

| | Strokes | | | | |
|---|---|---|---|---|---|
| | 1,000 | 2,000 | 3,000 | 4,000 | 5,000 |
| Wax | 86 | 87 | 88 | 87 | 83 |
| Control | 51 | 67 | 65 | 69 | 71 |

*Example III*

Seventy-five grams of p-xylylene glycol (0.543 mol) was heated to 250° C. and carbon dioxide was passed through it to aid in the removal of any water which formed. No apparent reaction occurred and the p-xylylene glycol had a tendency to sublime. Heating was discontinued. The p-xylylene glycol appeared to be unchanged.

The p-xylylene glycol which had been heated was placed in 200 cc. (173 grams) of toluene, 0.5 gram (0.0029 mol) of p-toluenesulfonic acid was added, and the solution was refluxed at 110° C. for 20 hours. A Dean moisture-vapor trap was used to remove the water formed. Heating was discontinued, the reaction mixture was allowed to cool to room temperature, and the product which separated was filtered and dried at 50° C. in a vacuum oven for 16 hours. Sixty-three grams of a hard, crystalline powder was obtained which had a gram molecular weight, determined by boiling point elevation in benzene, of 1365.

A 50/50 mixture by volume of methyl ethyl ketone and toluene was used for testing the solubility of the product. The mixture was heated to the boiling point of the solvent and gave a clear solution.

As will be evident to those skilled in the art, various modifications of this invention can be made or followed in the light of the foregoing disclosure and discussion without departing from the spirit or scope of the disclosure or from the scope of the claims.

I claim:

1. Process for preparing a normally solid polymer of p-xylylene glycol having a molecular weight of more than 300 which comprises heating p-xylylene glycol in the presence of from 0.01 to 2 parts by weight per 100 parts by weight of p-xylylene glycol of a hydrocarbon sulfonic acid catalyst and in the presence of from 1 to 10 parts by weight per 1 part by weight of p-xylylene glycol of at least one solvent selected from the group consisting of benzene and alkyl-substituted benzenes in which the total number of alkyl groups does not exceed three, the total number of carbon atoms in the alkyl substituents is not greater than six, and the number of carbon atoms in any one substituent does not exceed four, and continuing said heating for a period of time until said polymer is formed.

2. Process for preparing a normally solid polymer of p-xylylene glycol having a molecular weight of more than 300 which comprises heating p-xylylene glycol in the presence of from 0.01 to 2 parts by weight per 100 parts by weight of p-xylylene glycol of an aromatic hydrocarbon sulfonic acid catalyst and in the presence of from 1 to 10 parts by weight per 1 part by weight of p-xylylene glycol of at least one solvent selected from the group consisting of benzene and alkyl-substituted benzenes in which the total number of alkyl groups does not exceed three, the total number of carbon atoms in the alkyl substituents is not greater than six, and the number of carbon atoms in any one substituent does not exceed four, and continuing said heating for a period of time until said polymer is formed.

3. Process of claim 1 wherein between 3 and 6 parts by weight of said solvent is employed per part of p-xylylene glycol.

4. A process of claim 1 wherein between 0.1 and 1 part by weight of said catalyst is present per 100 parts by weight of p-xylylene glycol.

5. A process of claim 2 wherein the temperature of the reaction is maintained between 80 and 140° C.

6. Process for preparing a normally solid polymer of p-xylylene glycol having a molecular weight of more than 300 which comprises heating p-xylylene glycol in the presence of from 0.01 to 2 parts by weight per 100 parts by weight of p-xylylene glycol of a hydrocarbon sulfonic acid catalyst containing 2 to 16 carbon atoms per molecule and in the presence of from 1 to 10 parts by weight per 1 part by weight of p-xylylene glycol of at least one solvent selected from the group consisting of benzene and alkyl-substituted benzenes in which the total number of alkyl groups does not exceed three, the total number of carbon atoms in the alkyl substituents is not greater than six, and the number of carbon atoms in any one substituent does not exceed four, and continuing said heating for a period of time until said polymer is formed.

7. Process for preparing a normally solid polymer of p-xylylene glycol having a molecular weight of more than 300 which comprises heating p-xylylene glycol in the presence of from 0.01 to 2 parts by weight per 100 parts by weight of p-xylylene glycol of a toluene sulfonic acid catalyst and in the presence of from 1 to 10 parts by weight per 1 part by weight of p-xylylene glycol of at least one solvent selected from the group consisting of benzene and alkyl-substituted benzenes in which the total number of alkyl groups does not exceed three, the total number of carbon atoms in the alkyl substituents is not greater than six, and the number of carbon atoms in any one substituent does not exceed four, and continuing said heating for a period of time until said polymer is formed.

8. Process of claim 1 wherein between 3 and 6 parts by weight of said solvent is employed per part of p-xylylene glycol and between 0.1 and 1 part by weight of said catalyst is employed per 100 parts by weight of p-xylylene glycol.

References Cited in the file of this patent

Rhoad et al.: "J. A. C. S.," vol. 772, May 1950, pp. 2216–19.